(12) United States Patent
Wigmore

(10) Patent No.: US 6,776,192 B2
(45) Date of Patent: Aug. 17, 2004

(54) PNEUMATIC VALVE AND MANIFOLD MOUNTING SYSTEM

(75) Inventor: Richard Wigmore, East Sussex (GB)

(73) Assignee: Mead Fluid Dynamics, Inc., Chicago, IL (US)

(*) Notice: Subject to any disclaimer, the term of this patent is extended or adjusted under 35 U.S.C. 154(b) by 12 days.

(21) Appl. No.: 10/121,926

(22) Filed: Apr. 12, 2002

(65) Prior Publication Data

US 2003/0192607 A1 Oct. 16, 2003

(51) Int. Cl.[7] ............................................. F16K 11/20
(52) U.S. Cl. ........................................................ 137/884
(58) Field of Search .................................. 137/271, 884

(56) References Cited

U.S. PATENT DOCUMENTS

| | | | |
|---|---|---|---|
| 3,875,959 A | * | 4/1975 | Bouteille ................. 137/119.1 |
| 4,224,957 A | * | 9/1980 | Darves et al. .............. 137/270 |
| 6,363,970 B1 | | 4/2002 | Wolter |
| D458,985 S | | 6/2002 | Kleffmann |
| 6,427,723 B2 | | 8/2002 | Bogdanowicz et al. |
| 6,450,202 B2 | | 9/2002 | Bogdanowicz |
| 6,453,948 B2 | | 9/2002 | Notz et al. |
| 2002/0174905 A1 | | 11/2002 | Latino et al. |

* cited by examiner

Primary Examiner—John Fox
(74) Attorney, Agent, or Firm—Andrus, Sceales, Starke & Sawall, LLP

(57) ABSTRACT

A manifold mounting system for electrically operated pneumatic control valves includes a push-on snap lock latching arrangement that is responsive to simple straight line connecting movement of the valve to the manifold. The system completely eliminates the need for end plates, screws, O-rings, gaskets and the like, and the simultaneous accommodation of a plug-in electrical connection also eliminates wiring connections. Manual push button release provides equally simple disconnection of the valve from the manifold.

16 Claims, 5 Drawing Sheets

PNEUMATIC VALVE AND MANIFOLD MOUNTING SYSTEM

FIELD OF THE INVENTION

The present invention pertains to a system for mounting a plurality of fluid control valves to a common manifold and, more particularly, to a plug-in mounting system for pneumatic control valves that includes plug-in connection for both the pneumatic connections and the electrical connections.

Manifolding for pneumatic control valves is well known and provides a convenient and cost effective method for supplying pneumatic pressure for the operation of multiple devices. The manifold will typically carry a stack of pneumatic valves mounted in side-by-side relation with the manifold having common air supply and exhaust air channels for all of the valves. The manifold may also include a common pilot pressure supply conduit. It is also known to provide the manifold with a common electric power supply line including individual electrical connections to each valve to supply operating power such as for the valve solenoids. One prior art pneumatic supply manifold for a valve stack assembly is shown in U.S. Pat. No. 5,341,846.

Prior art manifolding systems may still require the use of connecting end plates, screws, O-rings, gaskets and locking clips, all of which add to the complexity of mounting and demounting of valves to the manifold. The above-identified patent also discloses a collet construction for the inlet and outlet ports in a pneumatic valve that simplifies pneumatic connections, including connections to a manifold. Furthermore, U.S. Pat. Nos. 5,222,715 and 6,016,838 show a unique pneumatic valve construction utilizing a half shell design in which two mirror image halves allow flow channels and internal component compartments to be molded in the shells into which the valve elements are inserted before the shells are ultrasonically welded together. This pneumatic valve construction provides substantially enhanced performance in a much smaller valve body. The inlet and outlet ports of this pneumatic valve also utilize the connecting collet construction described above to enhance connections to both a manifold and to the pneumatic lines from the valve to the pneumatic devices being operated.

SUMMARY OF THE INVENTION

In accordance with the present invention, a manifold system, particularly adapted to utilize the prior art pneumatic valves described above, provides a unique push-on, plug-in connection and similar easy release that quickly makes both the pneumatic connections and the electrical connections to the manifold without the need for any tools whatsoever.

The manifold mounting system of the present invention is particularly adapted for use with fluid control valves of the type that have an enclosing valve body, such as that using the above-identified half shell construction, which valve body includes a generally flat mounting face that defines fluid inlet and outlet openings. In a typical pneumatic valve, the fluid inlet and outlet openings accommodate the supply of pressurized air and the exhaust thereof respectively. The manifold comprises a manifold body that has an attachment face for a plurality of valve bodies, and the attachment face includes a plurality of face portions defining respective fluid inlet and outlet connector groups. Each connector group is adapted to make fluid connection to the fluid inlet and outlet openings in a valve mounting face of one valve body in response to relative connecting movement of the valve mounting face and the manifold face portion toward one another on a line generally perpendicular to the faces. The system includes a latching mechanism that is responsive to the connecting movement to complete the fluid connection and establish a locked position to lock the valve body to the manifold body in face-to-face relation. The latching mechanism is also responsive to manual deflection to unlock the valve body for disconnection and removal from the manifold.

In a preferred embodiment, the latching mechanism comprises a latch plate that is slidably attached to the attachment face portion of the manifold and is moveable in the plane thereof between the locked position and an unlocking position. Locking detents on the latch plate are adapted to be received in slots in the valve body in the locked position, and a resilient biasing device operates to interconnect the latch plate and the manifold body to bias the latch plate toward the locked position. In the preferred embodiment, the manifold face portion includes a latch plate track having undercut holddown surfaces on opposite sides of the track that extend parallel to the line of slide plate movement, and the slide plate includes complementary angled side edge surfaces that are adapted to slidably engage the holddown surfaces in a dovetail connection.

The latch plate locking detents comprise a pair of hook members that extend upwardly from opposite longitudinal ends of the latch plate, and the valve body includes a pair of locking recesses that are alignable with the hook members in the unlocking position of the latch plate in response to connecting movement, the hooks being moveable into locking engagement in the recesses in the valve body in response to biasing movement of the latch plate to the locked position. Preferably, the biasing device comprises a compression spring captured between one end of the latch plate and an end face of the manifold body. Either the hook members on the latch plate or the locking recesses in the valve body include inclined lead-in surfaces that are operative to impose a counter bias force on the biasing device in response to connecting movement to initially move the latch plate to the unlocking position.

The fluid inlet and outlet connectors on the attachment face portions of the manifold body comprise integral tubular extensions that extend generally perpendicular to the face portions and are adapted to be received in the respective fluid inlet and outlet openings in the valve body mounting face. Preferably, the tubular extensions extend from the face portion farther than the locking detents to provide initial alignment of the valve body with the manifold face portion. The valve body mounting face also preferably includes a plug-in electrical connector, and the manifold attachment face portion includes a complementary contact slot for the electrical connector. A bus bar may be mounted inside the manifold body to provide electrical connections to the contact slots in the manifold face portions. The manifold body may also include a common fluid inlet and outlet section at one end of the body that provides a common fluid supply inlet, a common fluid exhaust outlet, and a common connector for the bus bar. The inlet and outlet connector groups in the manifold face portions each includes a supply connector, an exhaust connector and a pilot supply connector, and the manifold body common section includes a common pilot fluid supply inlet.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
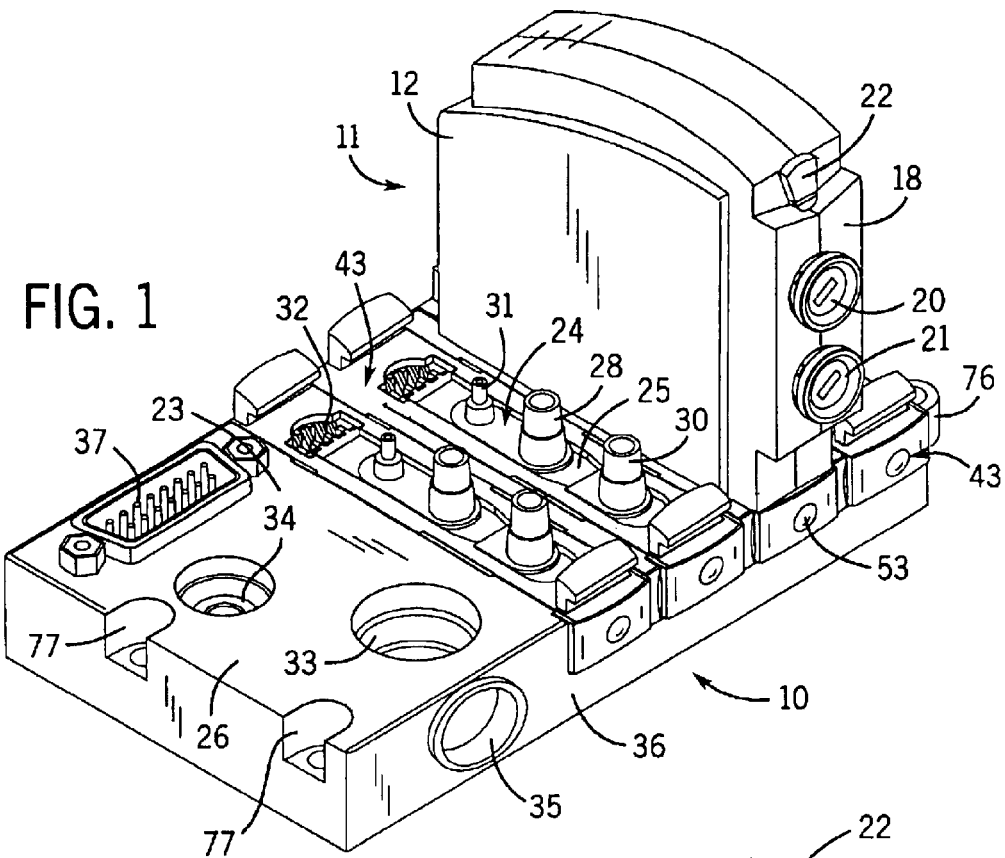
FIG. 1 is an isometric view of the manifold and valve mounting arrangement of the present invention.
Figure 2:
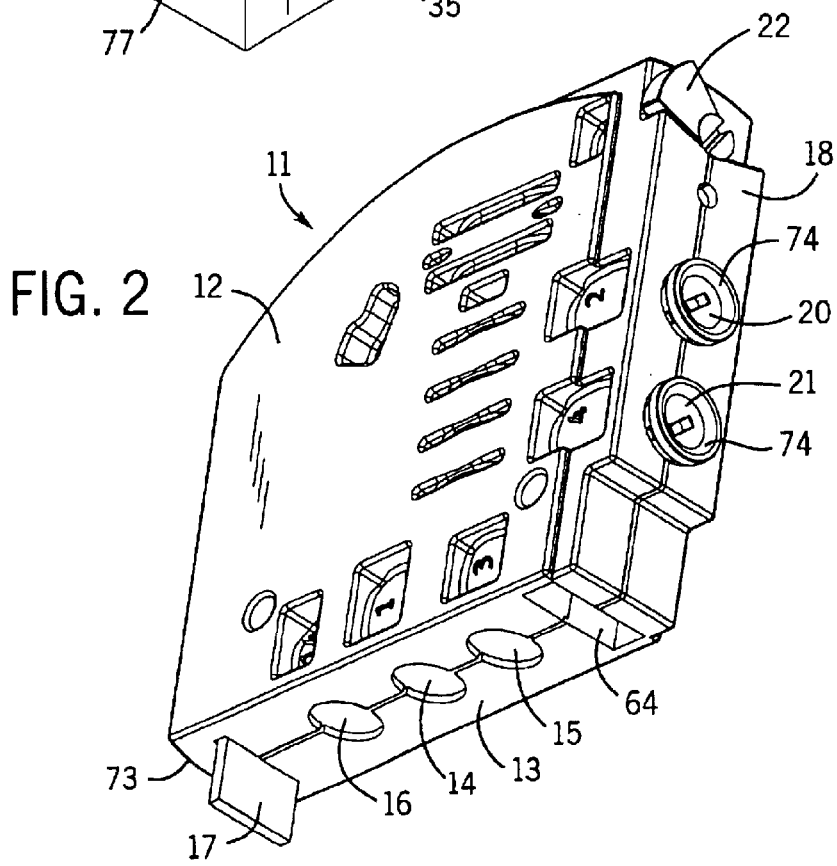
FIG. 2 is an isometric view of a single pneumatic valve of one type intended for use with the manifold of the subject invention.

FIG. 1 shows a pneumatic fluid distribution and electrical connection manifold 10 for a plurality of pneumatic valves 11 which valves are attached to the manifold in a conventional stacked arrangement for convenience, to save space, and to reduce piping. The manifold 10 shown in FIG. 1 accommodates four pneumatic control valves 11 each of which is individually attached to the manifold. Of course, the manifold may be made to mount any number of valves. Referring also to FIG. 2, the valve 11 may be of the type described in the above-identified U.S. patents, comprising a valve body 12 made of two mirror image halves molded to optimally define the interior flow channels and component compartments, and into which the internal components are positioned before the halves are ultrasonically welded, creating a strong bond and hermetically sealed valve body that completely eliminates the need for fasteners, adhesives, gaskets and inserts. The particular valve 11 shown is a four way, two position double solenoid valve, but various other valve types using the same basic half shell construction may also be utilized and mixed in any manner on the manifold 10.

The valve body 12 has a mounting face 13 that includes an air inlet opening 14 and an exhaust outlet opening 15. The mounting face 13 also includes a pilot air inlet opening 16 and a plug-in electrical connector 17. The adjacent front face 18 of the valve body includes upper and lower air openings 20 and 21 which, based on the particular valve configuration and operation may comprise inlet and/or outlet ports. The front face 18 also includes a two position manual override switch 22 for the internal solenoids.

The manifold body 23 has a generally flat upper attachment face 24 that includes a number of face portions 25 to which the valves 11 are attached at their respective mounting faces 13. The upper attachment face 24 also includes a common mounting section 26 adjacent the face portions 25. Each attachment face portion 25 includes three integral tubular extensions 27 adapted to be received in the openings 14, 15 and 16 in the valve body mounting face 13. Within the valve 11, internal O-ring seals surround and make sealing engagement with the upper ends of the extensions 27 when the valve body is in place. The tubular extensions 27 in each face portion 25 comprise a fluid connector group that includes an air supply connector 28, an exhaust air connector 30, and a pilot air connector 31. The face portion 25 also includes a contact slot 32 for the plug-in electrical connector 17 on the mounting face of the valve.

The upper face of the common mounting section 26 of the manifold body 23 includes a common exhaust outlet port 33 and a common pilot air inlet port 34. A common air supply inlet port 35 is located in the front face 36 of the common mounting section 26. A common electrical connector 37, such as a conventional 15-pin sub-D connector, is also mounted in the upper face of common mounting section 26.

Figure 6:
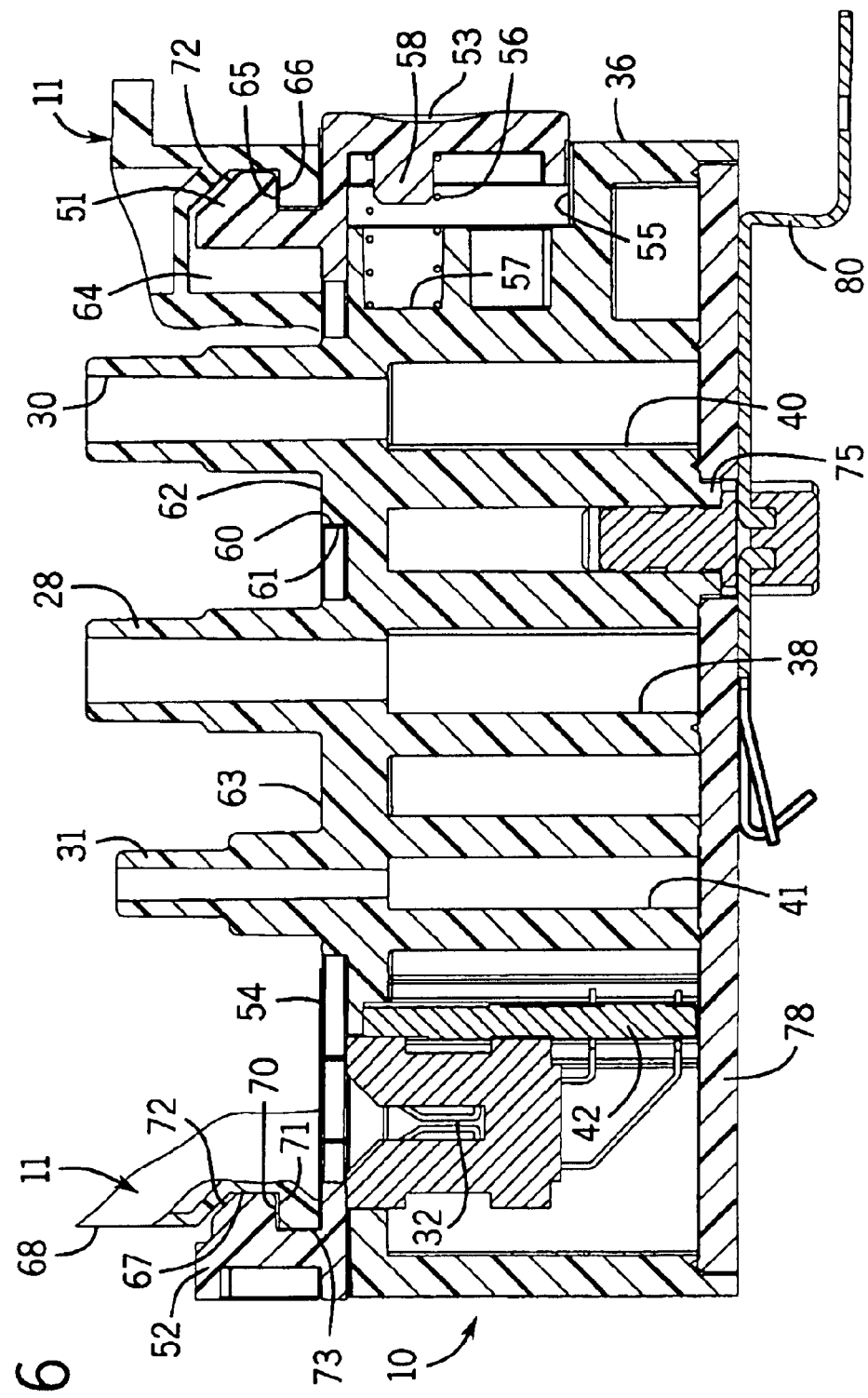
FIG. 6 is a section taken on line 6—6 of FIG. 3 with portions of the valve broken away.
Figure 7:
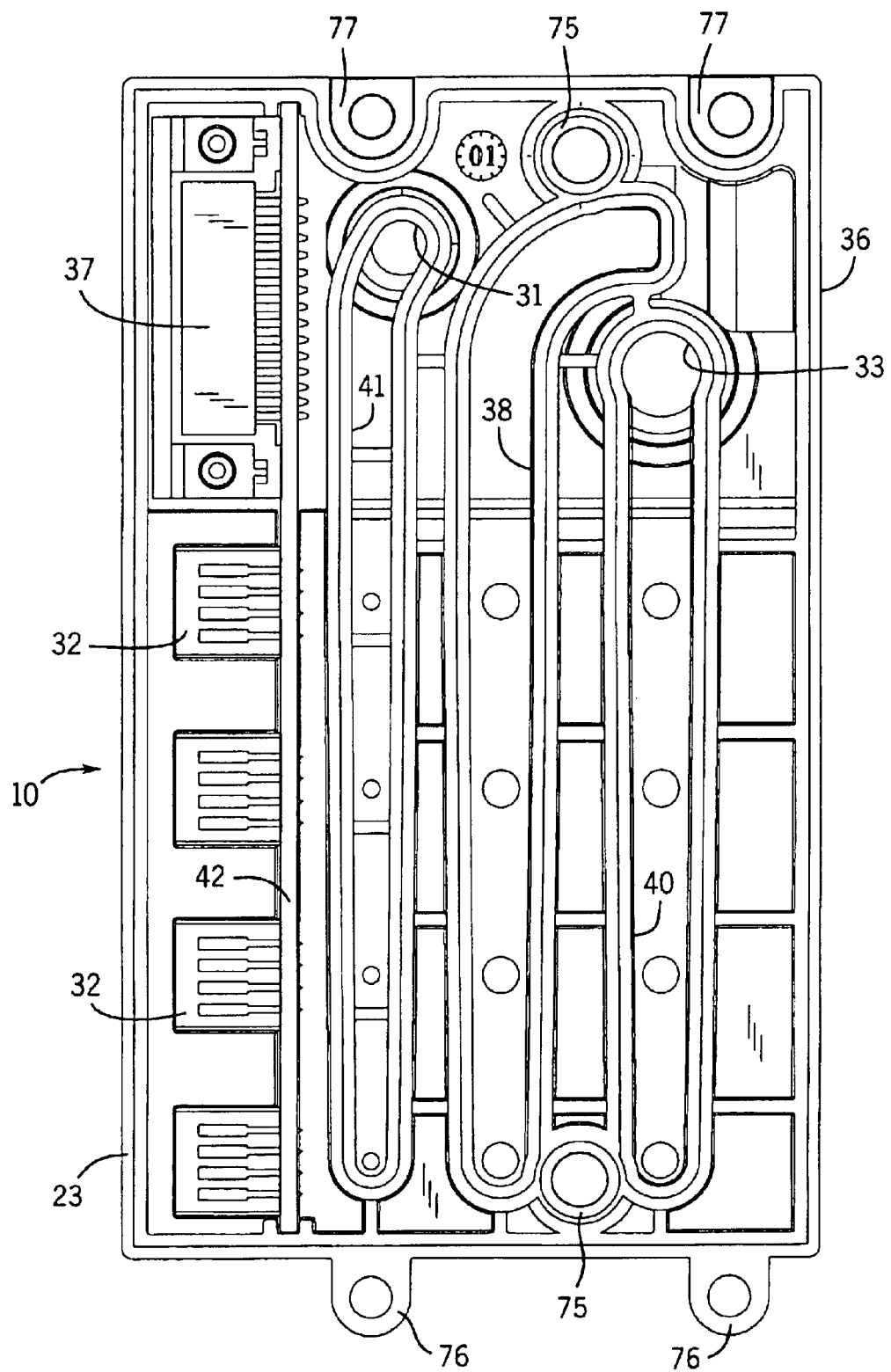
FIG. 7 is a bottom plan view of the manifold with the enclosing cover plate removed.

Referring also to FIGS. 6 and 7, the interior of the manifold body 23 includes an air supply channel 38 connecting the common air supply inlet 35 to the air supply connectors 28, an exhaust channel 40 connecting the common exhaust outlet 33 with the exhaust air connectors 30, and a pilot air supply channel 41 connecting the common pilot air inlet 34 to the pilot air connectors 31. A bus bar 42 is also mounted along the interior of the manifold, extending generally parallel to the channels 38, 40 and 41, to provide electrical interconnection between the contact slots 32 and the common connector 37.

Figure 3:
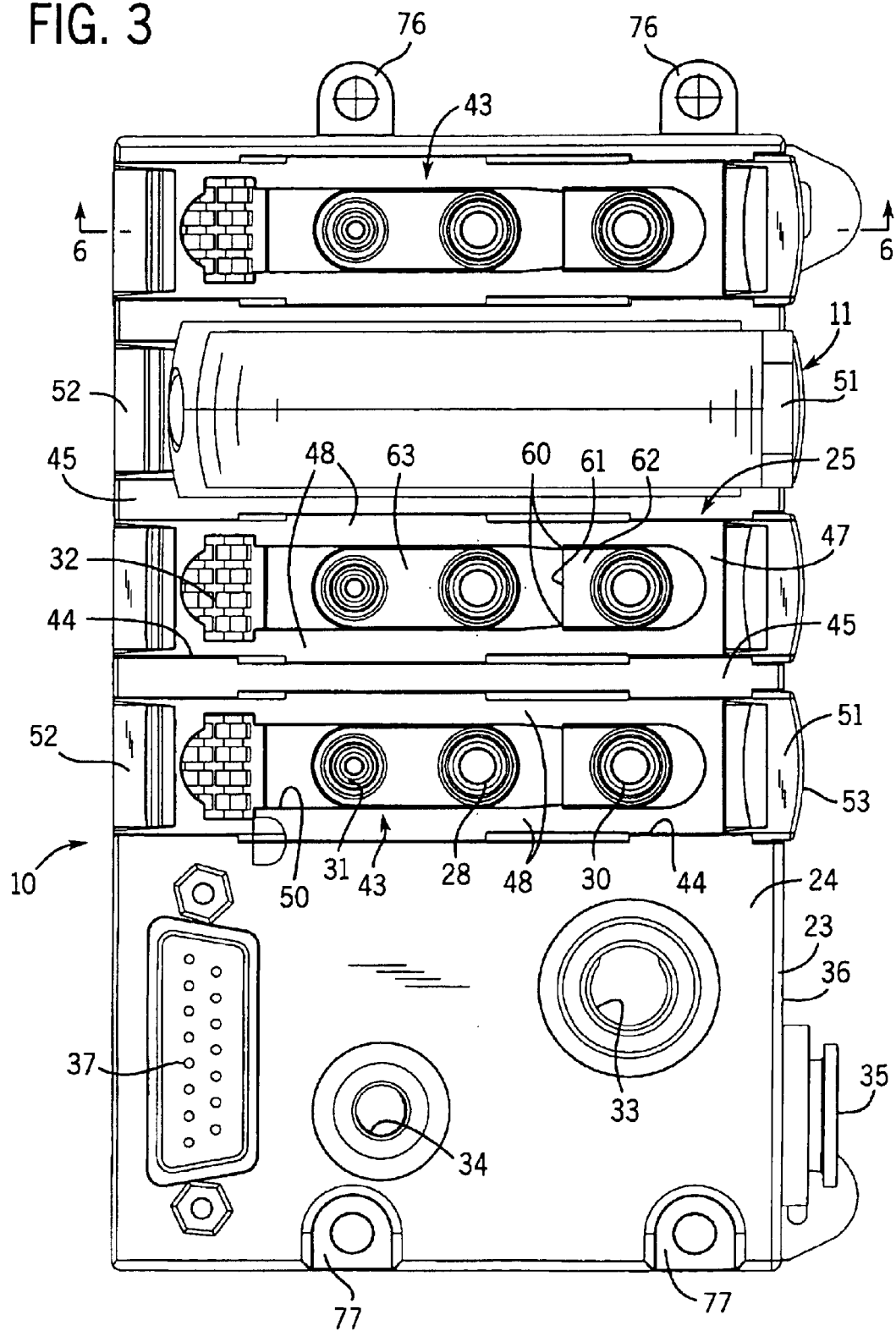
FIG. 3 is a top plan view of the FIG. 1 assembly with some of the valves removed.
Figure 4:
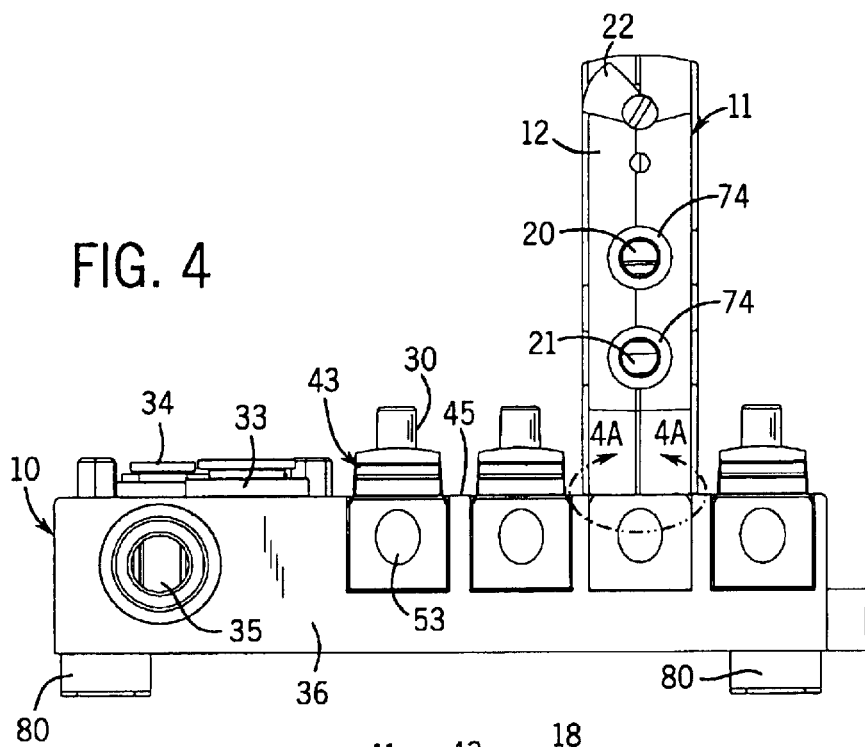
FIG. 4 is a right side elevation view of the assembly shown in FIG. 3.
Figure 4A:
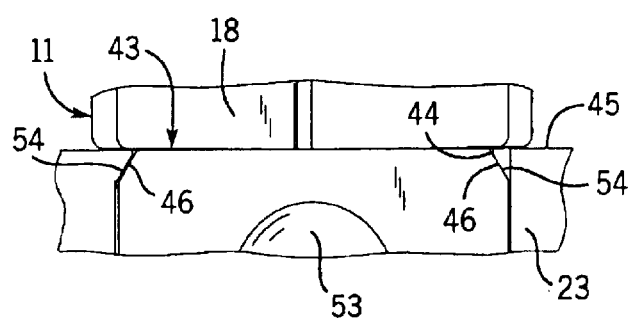
FIG. 4A is a detail of a portion of FIG. 4.
Figure 5:
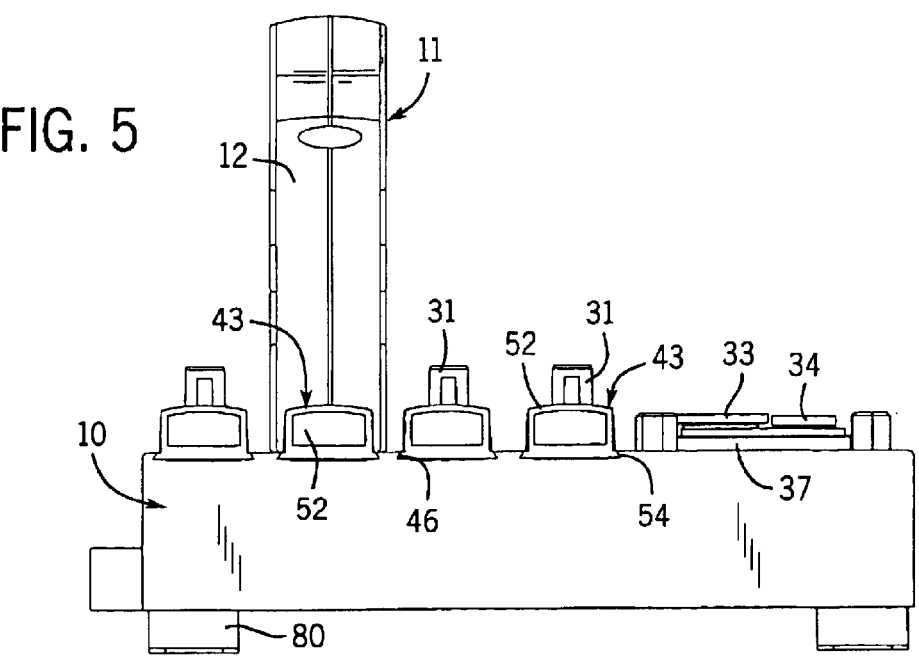
FIG. 5 is a left side elevation view of the assembly shown in FIG. 3.

Each of the pneumatic valves 11 is individually attached to the manifold 10 with a simple, straight push-on movement that automatically establishes all of the air connections to and from the manifold as well as the electrical connection to operate the valve solenoid(s). The latching mechanism includes a spring-biased latch plate 43 that is slidably attached to each face portion 25 in the upper face of the manifold body 23. Referring also to FIGS. 3–5, the latch plate 43 lies in and slides along a slot 44 in the mounting face portion 25 of the manifold. Each slot 44 is defined by opposite edge surfaces 45 which, as best seen in FIG. 5, are undercut to define downwardly divergent holddown surfaces 46. The latch plate body 47 includes parallel edge members 48 that define an open center 50 and are interconnected at their opposite ends by a pair of upstanding hook members comprising a front hook member 51 and a rear hook member 52. Adjacent the front hook member 51 is an integral downwardly depending face button 53. The latch plate edge members 48 are provided with angled side edge surfaces 54 that are also downwardly divergent and complementary to the holddown surfaces 46 of the latch plate edge surfaces 45. The latch plate 43 thus may be inserted into the slot 44 in the manifold face portion in a dovetail fashion so that it may slide in a direction of the edge members but be retained against displacement from the slot in a direction perpendicular to the face. Further, latch plate body 47 has a thickness equal to the depth of the slot 44 such that the raised edge surfaces 45 and the upper surface of the latch plate body 47 are coplanar and together define the face portion 25 against which the mounting face 13 of the valve body is received. The open center 50 of the latch plate body accommodates the tubular extensions from the manifold, including air supply connector 28, exhaust air connector 30 and pilot air connector 31, as well as access to the electrical contact slot 32.

As best seen in FIG. 6, the latch plate face button 53 is of generally rectangular shape and sits in a rectangular recess 55 in the front face 36 of the manifold body 12. A compression spring 56 is captured at one end in a blind bore 57 in wall of the recess 55 and at the opposite end on a cylindrical protrusion 58 on the backside of the face button 53. The compression spring 56 biases the latch plate 43 toward a locking position, the limit of which is defined by a pair of inner edge barbs 60 on the inside edges of the side edge surfaces 54 of the latch plate, which edge barbs engage opposite lateral ends of an abutment surface 61 defined by a slightly raised surface portion 62 surrounding the upstanding exhaust air connector 30 in the face of the manifold. Preferably, the upstanding air supply connector 28 and pilot air connector 31 are also connected by a second raised surface portion 63. Both the first and second raised surface portions 62 and 63 have upper surfaces that are coplanar with the edge surfaces 45 of the slot and the upper surface of the latch plate edge members 48. Further, the side edges of the surface portions 62 and 63 help retain the latch plate side edge surfaces 54 in sliding engagement with the undercut edge surfaces 45 of the slot 44.

The front and rear hook members 51 and 52 on the latch plate 43 act as spring-biased locking detents to lock and hold the valve 11 in operative position on the manifold. The valve body 12 is provided with a front locking recess 64 formed in the mounting face 13 adjacent the exhaust outlet opening 15. The recess 64 includes an internal contact surface 65 that is engaged by a complementary hook contact surface 66. A rear locking recess 67 is formed in the rear face 68 of the valve body 12 immediately above the rear end of the mounting face 13. The rear locking recess also includes an internal contact surface 70 that is adapted to be engaged by a complementary hook contact surface 71 on the underside of the rear hook member 52. As indicated above, the latch plate biasing spring 56 biases the latch plate to the locking position. Each of the front and rear hook members 51 and 52 is provided with a downwardly sloping lead-in surface 72. When it is desired to attach a valve 11 to the manifold 10, the valve is oriented with its mounting face 13 generally parallel to and aligned with a face portion 25 of the manifold defining the position in which the valve is desired to be mounted. Mounting is accomplished by a simple straight downward movement of the valve on a line perpendicular to the respective faces 13 and 25. Initially, the upstanding tubular extensions 27 provide a guiding or piloting function as the valve is moved toward the manifold. Then contact is made between the forward edge of the front locking recess 64 and the lead-in surface 72 of the front hook member 51 and, simultaneously, the rear corner edge 73 of the valve body with the lead-in surface 72 of the rear hook member 52. Downward connecting movement of the valve body and the respective front and rear lead in surfaces 72 causes the latch plate 43 to slide against the bias of the compression spring 56 toward the unlocking position until the respective hook contact surfaces 66 and 71 override the respective interal contact surfaces 65 and 70 of the locking recesses, whereupon the hooks snap into locking contact in the recesses under the influence of the bias spring. This connecting movement also causes the plug-in electrical connector 17 be received in the contact slot 32 in the manifold mounting face portion 25. Instead of having the lead-in surfaces 72 on the hook members 51 and 52, they could as well be formed on the forward edge of the front locking recess 64 and on the rear corner edge 73 of the valve body. To release and remove the valve 11 from the manifold 10, the operator simply pushes the face button 53 against the bias of the spring 56 until the button bottoms in the rectangular recess 55, whereupon the hooks are clear of the locking recesses 64 and 67, and the valve can be lifted directly from the manifold.

The air flow openings 20 and 21 in the front face 18 of the valve are preferably provided with push-in collets 74 of the type described in U.S. Pat. No. 5,222,715. These collets are adapted to receive and secure the end of a plastic air flow tube for connection to the device being operated. It should be noted that with the manifold mounting arrangement of the present invention, the air supply and exhaust openings 14, 15 and 16 in the mounting face 13 of the valve do not require the use of push-in collets 74. Instead, the tubular extensions 27 in the manifold mounting face include a stepped construction that accommodates for the openings which are sized for the use of collets if the valve is used in another kind of mounting system.

Referring again to FIG. 7, the open underside of the manifold body 23 is enclosed with a flat rectangular cover plate 78 (shown in FIG. 6) ultrasonically welded or otherwise heat sealed to the manifold body to completely seal and isolate all of the air channels 38, 40 and 41. The housing also includes internal bosses 75 for the attachment of manifold mounting brackets or clips, such as a DIN rail clip 80. External bosses 76 and complementary slots 77 permit end-to-end interconnection of multiple manifolds 10.

I claim:

1. A manifold mounting system for fluid control valves of the type having an enclosing valve body including a mounting face that defines fluid inlet and outlet openings, said system comprising:

a manifold body having an attachment face for a plurality valve bodies, said attachment face including face portions defining respective fluid inlet and outlet connector groups, each group adapted to make fluid connection to the fluid inlet and outlet openings in a valve mounting face in response to relative connecting movement of the face and face portion toward one another on a line generally perpendicular thereto;

a latching mechanism attached to the manifold body responsive to said connecting movement to complete the fluid connection and establish a locked position by engaging locking recesses on the valve body to lock the valve body to the manifold body in face to face relation; and, said latching mechanism responsive to manual deflection to unlock the valve body for disconnection and removal from the manifold.

2. The system as set forth in claim 1 wherein said latching mechanism comprises:

a latch plate slidably attached to the attachment face portion of the manifold and movable in the plane thereof between the locked position and an unlocking position;

locking detents on the latch plate adapted to be received in slots in the valve body in the locked position; and, a resilient biasing device operatively interconnecting the latch plate and the manifold body to bias the latch plate toward the locked position.

3. The system as set forth in claim 2 wherein the manifold face portion includes a latch plate track having undercut holddown surfaces on opposite sides of the track extending parallel to the line of slide plate movement, and the latch plate includes complementary angled side edge surfaces adapted to slidably engage the holddown surfaces in a dovetail connection.

4. The system as set forth in claim 2 wherein said latch plate locking detents comprise a pair of hook members extending upwardly from opposite longitudinal ends of the latch plate, and the valve body includes a pair of locking recesses alignable with said hook members in the unlocking position of the latch plate in response to said connecting movement, said hooks moveable into locking engagement in said recesses in response to biasing movement of said latch plate to the locked position.

5. The system as set forth in claim 4 wherein said biasing device comprises a compression spring captured between one end of the latch plate and an end face of the manifold body.

6. The system as set forth in claim 4 wherein said hook members or said locking recesses include inclined lead-in surfaces operative to impose a counterbias force on said biasing device in response to connecting movement to initially move the latch plate to the unlocking position.

7. The system as set forth in claim 2 wherein the fluid inlet and outlet connectors on the attachment face portions of the manifold body comprise integral tubular extensions extending generally perpendicular to said face portions and adapted to be received in the respective fluid inlet and outlet openings in the valve body mounting face.

8. The system as set forth in claim 7 wherein said tubular extensions extend from said face portions farther than said locking detents to provide initial alignment of the valve body with the manifold face portion.

9. The system as set forth in claim 8 wherein said valve body mounting face includes a plug-in electrical connector and the manifold attachment face portion includes a complementary contact slot for said electrical connector.

10. The system as set forth in claim 9 including a bus bar mounted inside the manifold body and providing electrical connections to the contact slots in the manifold face portions.

11. The systems as set forth in claim 10 wherein said manifold body includes a common fluid inlet and outlet section at one end of the body having a common fluid supply inlet, a common fluid exhaust outlet, and a common connector for said bus bar.

12. The system as set forth in claim 11 wherein said inlet and outlet connector groups in the manifold face portions each include a supply connector, an exhaust connector and a pilot supply connector, and said manifold body common section includes a common pilot fluid supply inlet.

13. A manifold mounting system for fluid control valves of the type having an enclosing valve body including a mounting face that defines fluid inlet and outlet openings, said system comprising:
  a manifold body having an attachment face for a plurality valve bodies, said attachment face including face portions defining respective fluid inlet and outlet connector groups, each group adapted to make fluid connection to the fluid inlet and outlet openings in a valve mounting face in response to relative connecting movement of the face and face portion toward one another on a line generally perpendicular thereto;
  a unidirectional latching mechanism in the manifold responsive to said connecting movement to complete the fluid connection and establish a locked position by engaging locking recesses on opposite sides of the valve body to lock the valve body to the manifold body in face to face relation; and,
  said latching mechanism responsive to manual deflection in an opposite direction to simultaneously disengage from the locking recesses and unlock the valve body for disconnection and removal from the manifold.

14. A manifold mounting system for fluid control valves of the type having an enclosing valve body including a mounting face that defines fluid inlet and outlet openings, said system comprising:
  a manifold body having an attachment face for a plurality valve bodies, said attachment face including face portions defining respective fluid inlet and outlet connector groups, each group adapted to make fluid connection to the fluid inlet and outlet openings in a valve mounting face in response to relative connecting movement of the face and face portion toward one another on a line generally perpendicular thereto;
  a latching mechanism attached to the manifold body responsive to said connecting movement to complete the fluid connection and establish a locked position by engaging locking recesses on the valve body to lock the valve body to the manifold body in face to face relation; and,
  said latching mechanism responsive to manual deflection to unlock the valve body for disconnection and removal from the manifold, said latching mechanism comprising:
  a slidable latch plate forming an interface between the attachment face portion of the manifold and the mounting face of the valve body and movable in the plane of said interface between the locked position and an unlocking position; and,
  a resilient biasing device operatively interconnecting the latch plate and the manifold body to bias the latch plate toward the locked position.

15. The system as set forth in claim 14 wherein the latch plate is slidably attached to the manifold face portion, and said manifold face portion includes a latch plate track having undercut holddown surfaces on opposite sides of the track extending parallel to the line of slid plate movement, and the latch plate includes complementary angled side edge surfaces to slidably engage the holddown surfaces in a dovetail connection.

16. The system as set forth in claim 14 wherein said latch plate includes locking detents comprising a pair of hook members extending upwardly from opposite longitudinal ends of the latch plate, and the valve body includes a pair of locking recesses alignable with said hook members in the unlocking position of the latch plate in response to said connecting movement, said hooks moveable into locking engagement in said recesses in response to biasing movement of said latch plate to the locked position.

* * * * *